United States Patent
Achan et al.

(10) Patent No.: US 11,710,037 B2
(45) Date of Patent: Jul. 25, 2023

(54) SYSTEMS AND METHODS FOR ALTERING USER INTERFACES USING PREDICTED USER ACTIVITY

(71) Applicant: Walmart Apollo, LLC, Bentonville, AR (US)

(72) Inventors: Kannan Achan, Saratoga, CA (US); Afroza Ali, Belmont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 782 days.

(21) Appl. No.: 16/749,116

(22) Filed: Jan. 22, 2020

(65) Prior Publication Data

US 2020/0242469 A1 Jul. 30, 2020

Related U.S. Application Data

(60) Provisional application No. 62/797,601, filed on Jan. 28, 2019.

(51) Int. Cl.
*G06N 3/08* (2023.01)
*G06F 16/9535* (2019.01)
(Continued)

(52) U.S. Cl.
CPC .............. *G06N 3/08* (2013.01); *G06F 9/451* (2018.02); *G06F 16/9535* (2019.01); *G06N 3/04* (2013.01);
(Continued)

(58) Field of Classification Search
CPC ............ G06N 3/08; G06N 20/00; G06N 3/04; G06N 7/005; G06F 16/9535; G06F 9/451; G06Q 30/0269
See application file for complete search history.

(56) References Cited

U.S. PATENT DOCUMENTS 7,620,894 B1* 11/2009 Kahn .................. G06F 3/04895
715/708
10,013,152 B2* 7/2018 Nordstrom .......... G06F 3/04842
(Continued)

OTHER PUBLICATIONS

Jiang et al., "Life-stage Prediction for Product Recommendation in E-commerce", 2015, KDD '15, pp. 1879-1888. (Year: 2015).*
(Continued)

*Primary Examiner* — Ying Yu Chen
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of: monitoring first activities of a user over a first time period; based on the first activities of the user over the first time period, identifying, using a Markov model, a first probability of the user being in a first state; determining when the first probability is above a first probability predefined threshold; in response to determining when the first probability is above the first probability predefined threshold, automatically customizing first content on a graphical user interface for the first state to create a first graphical user interface on an electronic device of the user while the user is determined to be in the first state; monitoring second activities of the user over a second time period occurring after the first time period and after the user has been determined to be in the first state and before the user has been determined to be in a second state; based on the second activities of the user over the second time period, identifying, using a mixed model different from the Markov model, a second probability that the user has transitioned from the first state into the second state, wherein the second state is related to the first state; determining when the second probability is above a second probability predefined thresh-
(Continued)

old; and in response to determining when the second probability is above the second probability predefined threshold, automatically customizing a second content on the graphical user interface for the second state to create a second graphical user interface on the electronic device user while the user is determined to be in the second state. Other embodiments are disclosed herein.

20 Claims, 6 Drawing Sheets

(51) Int. Cl.
  *G06N 20/00* (2019.01)
  *G06N 3/04* (2023.01)
  *G06Q 30/0251* (2023.01)
  *G06F 9/451* (2018.01)
  *G06N 7/01* (2023.01)

(52) U.S. Cl.
  CPC ............... *G06N 7/01* (2023.01); *G06N 20/00* (2019.01); *G06Q 30/0269* (2013.01)

(56) References Cited

U.S. PATENT DOCUMENTS

| | | |
|---|---|---|
| 2012/0011530 A1 | 1/2012 | Bentolila et al. |
| 2013/0159228 A1* | 6/2013 | Meijer .................... G06F 9/451 706/14 |
| 2015/0170175 A1 | 6/2015 | Zhang et al. |
| 2015/0220951 A1 | 8/2015 | Kurapati et al. |
| 2015/0220999 A1 | 8/2015 | Thornton et al. |
| 2016/0260017 A1* | 9/2016 | João Viol Vieira ..... H04L 67/06 |
| 2020/0073888 A1 | 3/2020 | Fleischman et al. |

OTHER PUBLICATIONS

Talvarez, "Using Operating Thresholds with the BigML Dashboard", 2018, bigml blog, pp. 1-16. [https://blog.bigml.com/2018/01/24/using-operating-thresholds-with-the-bigml-dashboard/] (Year: 2018).*

* cited by examiner

SYSTEMS AND METHODS FOR ALTERING USER INTERFACES USING PREDICTED USER ACTIVITY

CROSS REFERENCE TO RELATED APPLICATIONS

This application claims the benefit of U.S. Provisional Application No. 62/797,601, filed Jan. 28, 2019, which is herein incorporated by this reference in its entirety.

TECHNICAL FIELD

This disclosure relates generally to graphical user interfaces (GUIs), and more specifically relates to systems and methods for changing GUIs in response to predicted state transitions of a user.

BACKGROUND

Communications over computer networks are shrouded in uncertainty with regards to the identity of the individual on the other end of the communication. Hackers, fraudsters, and other individuals with mal-intent routinely conceal their identities in order to exploit their victims. Further, many innocuous users of computer systems have begun to obscure their identities in order to prevent identification and/or tracking by governmental organizations and corporations. This presents many issues for the administrators of computer systems because user data can be used to customize GUIs, thereby enabling smoother, easier, and more efficient usages by the specific user.

Past solutions to the problem of customizing GUIs in response to user activity have focused merely on identifying general characteristics (otherwise referred to as "states") of a user based upon their behavior on a computer system. For example, an expectant mother can be recognized based on her browsing and GUI integration data using a traditional supervised learning method. These classifiers are snapshot-based, and try to form training instances that describe a target behavior based on snapshot of data at that point in time. These prior systems, though, are unable to identify transitions between different states based upon historic and predicted user behavior.

As another example, a snapshot-based classifier can use three months of historical data to predict states such as expectant mother, new mom, mom with a baby about to start solids, mom preparing for preschool, etc. Further, assume that the snapshot-based classifier has classified a user as an expectant mother in her second trimester. Here, a sustained prediction of states hinges on the availability of up-to-date and sustained browsing and GUI interaction activity. For example, say the expectant mother returns after six months of inactivity. Using a previously assigned state (expectant mom in second trimester) would be incorrect and would lead to incorrect GUI changes. Further, merely running an inference on one year old data will not yield meaningful insight on the present life stage, and instead will infer characteristics of the past and now irrelevant state. Nevertheless, since there is a steady state progression in the life stage (e.g., first to second trimester in three months, new mom to preparing for solids in two to four months, etc.), it can be used to make informed inferences about present life stages of what was previously identified as an expectant mother. In the above example, a steady state learning model would infer that a previously expectant mother becomes a new mom with some degree of certainty. Any additional observed activity (e.g., a single view for new born apparel) could significantly bias a model to this transition. These steady state models, though, cannot predict when transitions between more complex states are likely to occur. For example, ages at which babies begin to walk and therefore require new shoes can vary between different individuals.

Therefore, the below detailed description addresses at least the problem of learning and inferring a special class of segments: those that evolve over time

BRIEF DESCRIPTION OF THE DRAWINGS

To facilitate further description of the embodiments, the following drawings are provided in which.

Figure 1:
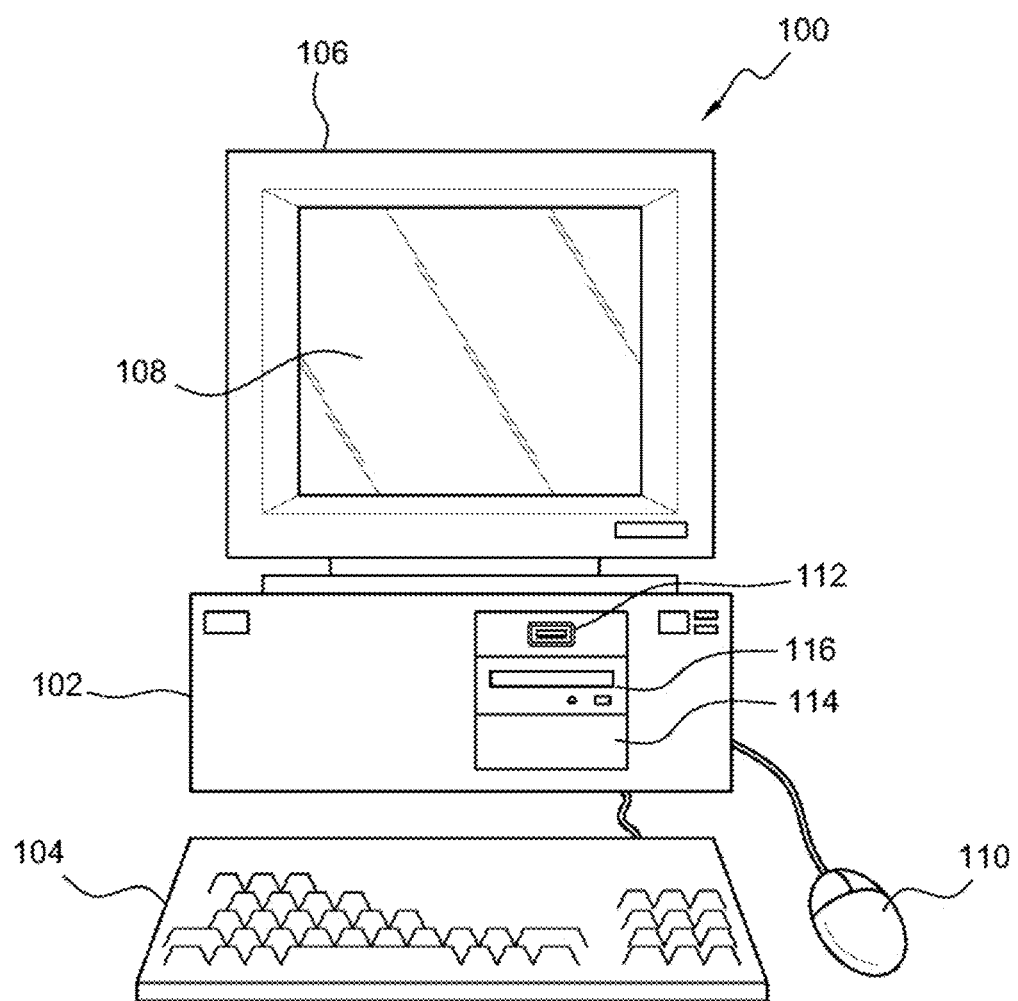
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory storage devices storing computing instructions configured to run on the one or more processors. The one computing insstructions can be configured to run on the one or more processors and perform acts of: monitoring first activities of a user over a first time period; based on the first activities of the user over the first time period, identifying, using a Markov model, a first probability of the user being in a first state; determining when the first probability is above a first probability predefined threshold; in response to determining when the first probability is above the first probability predefined threshold, automatically customizing first content on a graphical user interface for the first state to create a first graphical user interface on an electronic device of the user while the user is determined to be in the first state; monitoring second activities of the user over a second time period occurring after the first time period and after the user has been determined to be in the first state and before the user has been determined to be in a second state; based on the second activities of the user over the second time period, identifying, using a mixed model different from the Markov model, a second probability that the user has transitioned from the first state into the second state, wherein the second state is related to the first state; determining when the second probability is above a second probability predefined threshold; and in response to determining when the second probability is above the second probability predefined threshold, automatically customizing a second content on the graphical user interface for the second state to create a second graphical user interface on the electronic device user while the user is determined to be in the second state.

Various embodiments include a method. The method can be implemented via execution of computing instructions configured to run at one or more processors and configured to be stored at non-transitory computer-readable media The method can comprise monitoring first activities of a user over a first time period; based on the first activities of the user over the first time period, identifying, using a Markov model, a first probability of the user being in a first state; determining when the first probability is above a first probability predefined threshold; in response to determining when the first probability is above the first probability predefined threshold, automatically customizing first content on a graphical user interface for the first state to create a first graphical user interface on an electronic device of the user while the user is determined to be in the first state; monitoring second activities of the user over a second time period occurring after the first time period and after the user has been determined to be in the first state and before the user has been determined to be in a second state; based on the second activities of the user over the second time period, identifying, using a mixed model different from the Markov model, a second probability that the user has transitioned from the first state into the second state, wherein the second state is related to the first state; determining when the second probability is above a second probability predefined threshold; and in response to determining when the second probability is above the second probability predefined threshold, automatically customizing a second content on the graphical user interface for the second state to create a second graphical user interface on the electronic device user while the user is determined to be in the second state.

Figure 2:
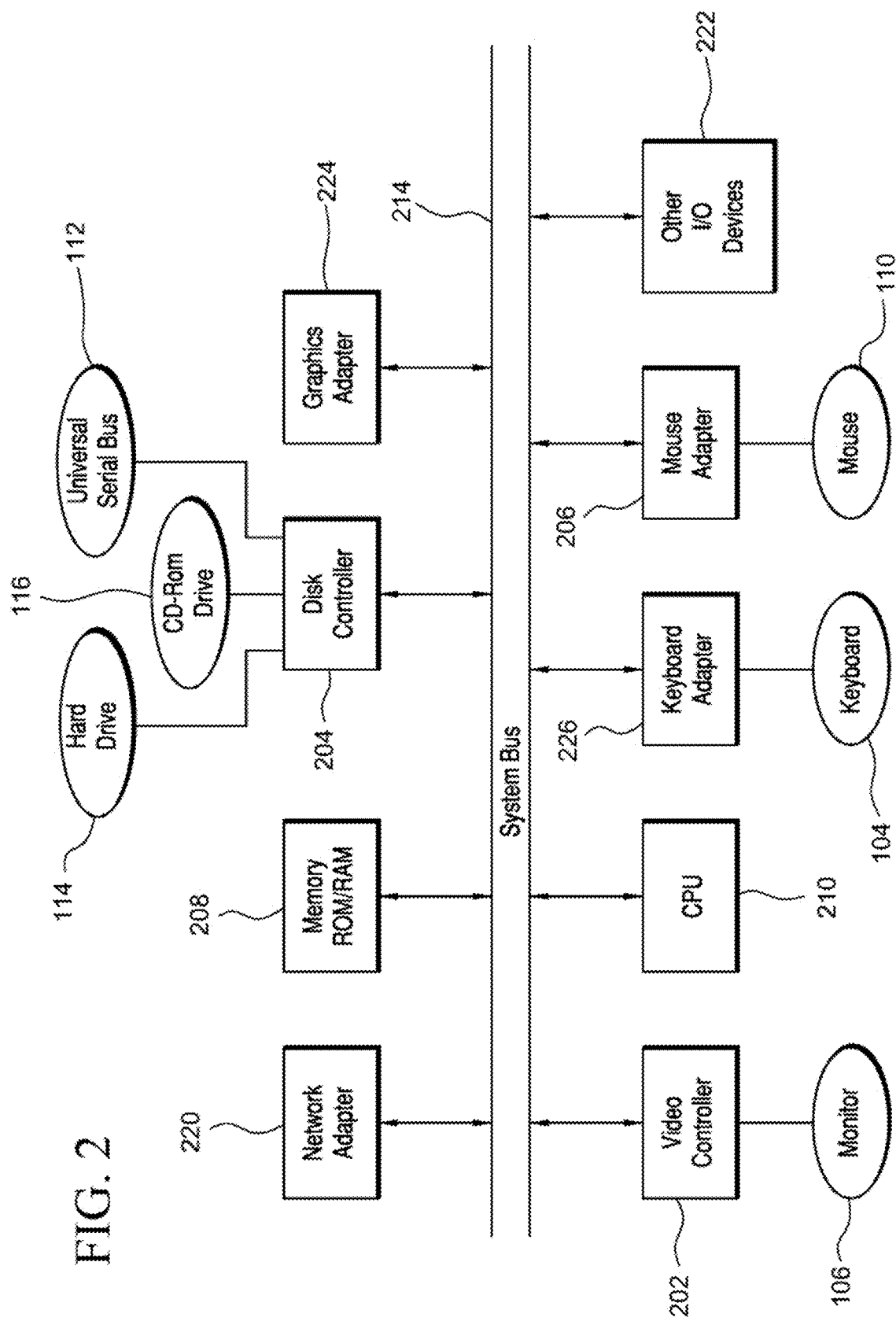
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
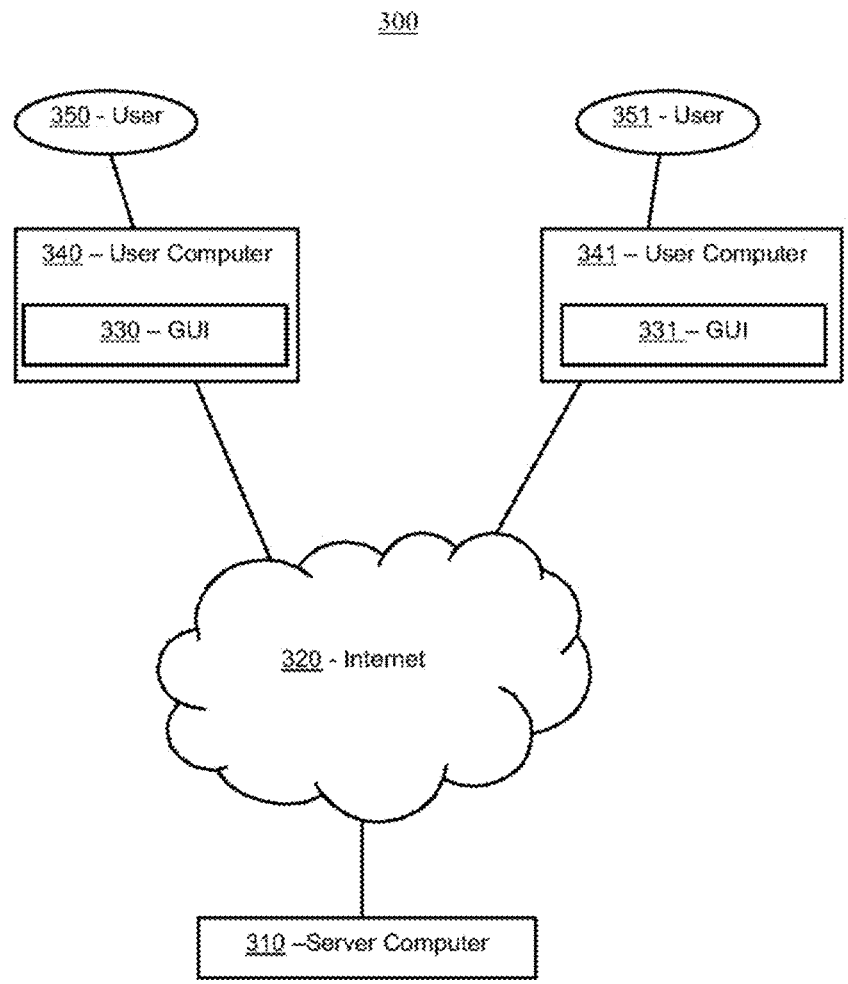
FIG. 3 illustrates a representative block diagram of a system, according to an embodiment.

Turning ahead in the drawings, FIG. 3 illustrates a block diagram of a system 300 that can be employed for altering user interfaces in response to predicted user activity, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a server computer 310, internet 320, user computers 340, 341, and/or GUI 330, 331. Server computer 310, internet 320, GUI 330, and/or user computer 340 can each be a computer system, such as computer system 100 (FIG. 1), as described above, and can each be a single computer, a single server, or a cluster or collection of computers or servers, or a cloud of computers or servers. In another embodiment, a single computer system can host each of two or more of server computer 310 and/or internet 320. Additional details regarding server computer 310, internet 320, GUI 330, and/or user computer 340 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 330, 331. In the same or different embodiments, GUI 330, 331 can be part of and/or displayed by user computers 340, 341, which also can be part of system 300. In some embodiments, GUI 330, 331 can comprise text and/or graphics (image) based user interfaces. In the same or different embodiments, GUI 330, 331 can comprise a heads up display ("HUD"). When GUI 330, 331 comprises a HUD, GUI 330, 331 can be projected onto glass or plastic, displayed in midair as a hologram, or displayed on monitor 106 (FIG. 1). In various embodiments, GUI 330, 331 can be color or black and white. In many embodiments, GUI 330, 331 can comprise an application running on a computer system, such as computer system 100, user computers 340, 341, and/or server computer 310. In the same or different embodiments, GUI 330, 331 can comprise a website accessed through internet 320. In some embodiments, GUI 330, 331 can comprise an eCommerce website. In the same or different embodiments, GUI 330, 331 can be displayed as or on a virtual reality (VR) and/or augmented reality (AR) system or display.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, server computer 310, internet 320, GUI 330, 331, and/or user computer 340, 341 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) server computer 310, internet 320, GUI 330, 331, and/or user computer 340, 341 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of server computer 310, internet 320, GUI 330, 331, and/or user computer 340, 341. In a similar manner, the processing module(s) and the memory storage module(s) can be local and/or remote to each other.

In many embodiments, server computer 310, internet 320, GUI 330, 331, and/or user computer 340, 341 can be configured to communicate with one or more user computers 340 and 341. In some embodiments, user computers 340 and 341 also can be referred to as customer computers. In some embodiments, server computer 310, internet 320, GUI 330, 331, and/or user computer 340, 341 can communicate or interface (e.g., interact) with one or more customer computers (such as user computers 340 and 341) through a network or internet 330. Internet 330 can be an intranet that is not open to the public. Accordingly, in many embodiments, server computer 310, internet 320, GUI 330, 331, and/or user computer 340, 341 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, server computer 310, internet 320, GUI 330, 331, and/or user computer 340, 341 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between server computer 310, internet 320, GUI 330, 331, and/or user computer 340, 341, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide several technological improvements. Specifically, the techniques described herein provide for the ability to determine a state and/or a transition of a user over a computer network. This approach is different from previous approaches, which could only determine which state a user was in, and which were unable to infer transitions of a user between states. Further, by customizing a GUI on a user computer in response to these transitions, navigation by the user on the user computer can be greatly improved and tailored to the user's specific state or predicted state. This can be especially applicable when a state is identified that would make it difficult for a user to navigate on a user computer with a small screen, such as on a mobile electronic device as described above. Further, these small screens provide very little area for displaying pictures and/or text on a GUI. The techniques described herein can be used to more efficiently utilize this limited display area (e.g., by rearranging a GUI for easier navigation or displaying relevant information on a GUI pertaining to the user's state) in response to an identified state of a user.

In many embodiments, the techniques described herein can be used continuously at a scale that cannot be reasonably performed using manual techniques or the human mind. For example, an amount of user interaction data required to determine a state transition can be too large to practically perform the disclosed machine learning techniques in the human mind.

Figure 4:
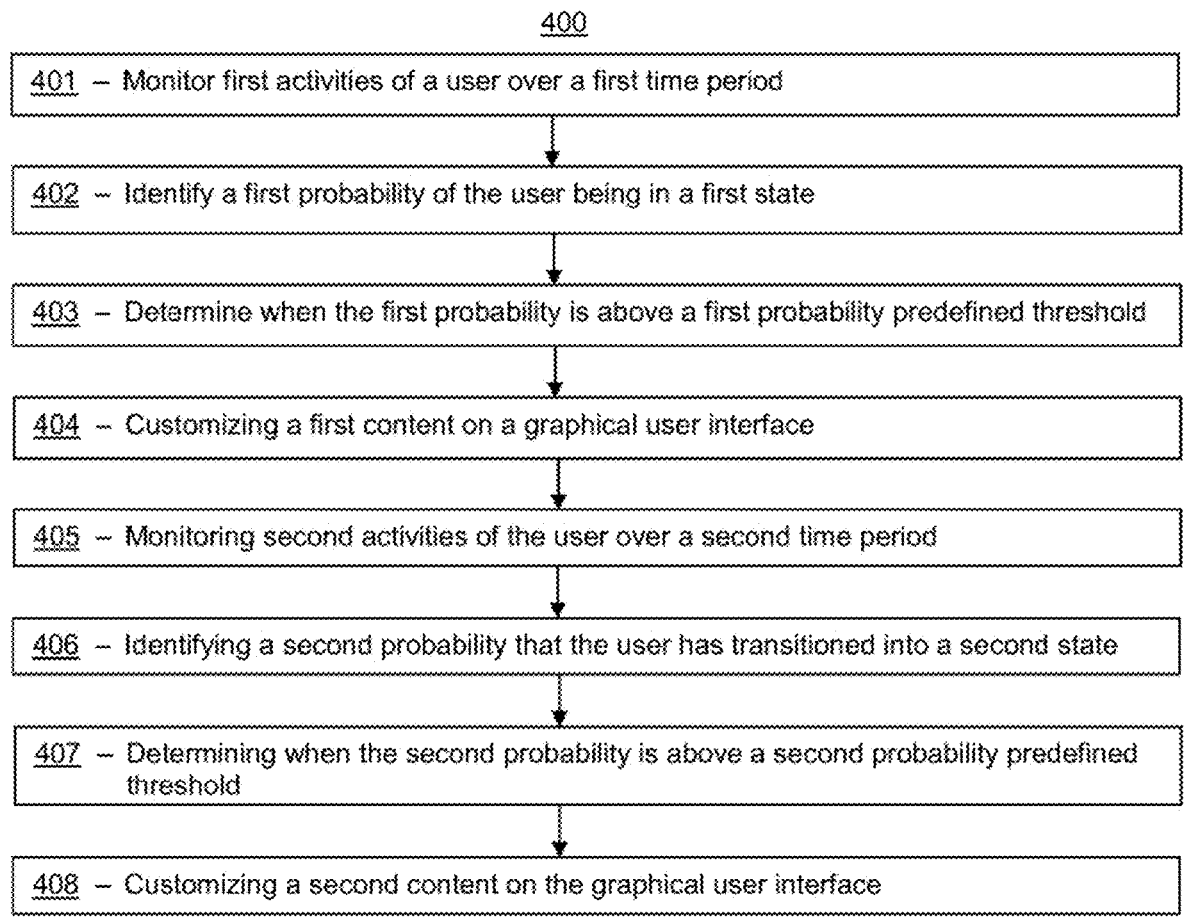
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules Such non-transitory memory storage modules can be part of a computer system such as server computer 310, internet 320, GUI 330, 331, and/or user computer 340, 341 (FIG. 3). The processing module(s) can be similar or identical to the processing module(s) described above with respect to computer system 100 (FIG. 1).

In many embodiments, method 400 can comprise an activity 401 of monitoring first activities of a user over a first time period. In various embodiments, monitoring first activities of a user can comprise gathering and storing data about interactions of a user with GUI 330, 331 or another GUI. In the same or different embodiments, monitoring first activities of a user can comprise gathering data on views of an item of a category of items, cart adds of the item of the category of items, registry adds of the item of the category of items, transactions involving the item of the category of items, and/or searches for the item of the category of items. In many embodiments, a first time period can comprise one day, two days, three days, one month, two months, three months, one year, two years, three years, etc. In the same or different embodiments, data about interactions of a user with a GUI can be stored as feature data suitable to be used in various machine learning algorithms, as described in further detail below.

In some embodiments, activity 401 and other activities in method 400 can comprise using a distributed network comprising distributed memory architecture to monitor first activities of a user over a first time period. This distributed architecture can reduce the impact on the network and system resources to reduce congestion in bottlenecks while still allowing data to be accessible from a central location.

In many embodiments, method 400 can comprise activity 402 of identifying a first probability of a user being in a first state. In the same or different embodiments, the first probability of the user being in the first state can be based on data gathered concerning first activities of the user over a first time period, such as data gathered in activity 401 as described above. In some embodiments, a first state can comprise a life stage of a user (e.g., an expectant mother or pregnant woman, a new mom, recently purchasing a new home, furnishing a new room, remodeling, landscaping an outdoor area, etc.) and/or a new hobby of a user (e.g., baking, home decorating, art, gardening, fitness, sports, do it yourself (DIY) projects, etc.).

In various embodiments, a first probability of a user being in a first state can be calculated using a Markov model. In many embodiments, the Markov model can comprise: $P(D) = \Pi_{t=1}^{T} P(s_t, f_t(u))$, wherein $P(D)$ comprises a probability of a user being in a first state, $s_t$ comprises a state at time t, $f_t$ comprise a set of observed features of a user until time t, and u comprises a specific user. In various embodiments, $f_t$ can comprise a feature set pertaining to user interaction with a GUI over a set period of time t. In the same or different embodiments, the Markov model can further comprise: $P(D) = \Pi_{t=1}^{T} \pi(s_t; f_t(u)) \psi(s_t, s_{t+1}; \Delta t)$, wherein $\psi(s_t, s_{t+1}; \Delta t)$ comprises a probability of a second state, $s_{t+1}$, following a first state, $s_t$, in $\Delta t$ units of time. In many embodiments, $\psi(s_t, s_{t+1}; \Delta t)$ can be viewed as a time bound transition probability from $s_t$ to $s_{t+1}$. In the same or different embodiments, $\psi(s_t, s_{t+1}; \Delta t)$ can comprise a steady state model (e.g., a snapshot model). In many embodiments, $\pi(s_t; f_t(u))$ can comprise a probability of a state, $s_t$, for a user, u, given observed interactions with a GUI. In various embodiments, the observed interactions with the GUI can be known as $f_t(u)$. In many embodiments, an instantiation of $\Delta t$ can comprise days elapsed between two observations. In some embodiments, the two observations can be known as $b_t$ and $b_{t+1}$, respectively. In the same or different embodiments, $b_t$ and $b_{t+1}$ can comprise boundary points between which observations are recorded. In these embodiments, $\Delta t$ can be computed as $b_{t+1}-b_t$.

In some embodiments, activity 402 and other activities in method 400 can comprise using a distributed network comprising distributed memory architecture to identify a first probability of a user being in a first state. This distributed architecture can reduce the impact on the network and system resources to reduce congestion in bottlenecks while still allowing data to be accessible from a central location. Use of distributed networks for identifying a first probability of a user being in a first state are especially applicable when, as computation of large datasets can reduce processing speeds and increase processing burdens on single processor computer systems.

In many embodiments, method 400 can comprise activity 403 of determining when a first probability is above a first probability predefined threshold. In some embodiments, a first probability predefined threshold can be set by an administrator of system 300. In various embodiments, activity 403 can comprise determining when a first probability is below a first probability predefined threshold. In the same or different embodiments, a first probability predefined threshold can be equal to or different than a second probability predefined threshold (described below). In some embodiments, activity 403 and other activities in method 400 can comprise using a distributed network comprising distributed memory architecture to determine when the first probability is above a first probability predefined threshold. This distributed architecture can reduce the impact on the network and system resources to reduce congestion in bottlenecks while still allowing data to be accessible from a central location.

In many embodiments, method 400 can comprise activity 404 of customizing a first content on a graphical user interface (GUI). In various embodiments, the GUI can comprise GUI 330, 331 (FIG. 3). In some embodiments, customizing a first content on a GUI can occur in response to activity 403 of determining when a first probability is above a first probability predefined threshold. In the same or different embodiments, customizing a first content on a GUI can comprise altering an image displayed on the GUI, altering text on the GUI, altering a layout of the GUI, changing the type of GUI, displaying an advertisement, displaying no advertisement, altering a color displayed on the GUI, etc. In various embodiments, customizing a first content on a GUI can comprise generating a new GUI. In many embodiments, customizing a first content on a GUI can comprise displaying certain content at specific times. In further embodiments, a first content can comprise advertisements for products and/or services. In various embodiments, a first content can be related to a first state of a user and/or a first state that a user has been determined to be in. In some embodiments, a first content on a GUI can be the same or different as a second content on a GUI, as described below. In many embodiments, customization of a GUI can create a first GUI. In the same or different embodiments, a first GUI can be the same or different than GUI 330, 331 (FIG. 3). In many embodiments, customizing a first content on a GUI can occur when a user is in a first state, as identified above. In the same or different embodiments, customizing a first content on a GUI can occur when a user is determined to be in a first state. In some embodiments, activity 404 and other activities in method 400 can comprise using a distributed network comprising distributed memory architecture to customize a first content on a graphical user interface. This distributed architecture can reduce the impact on the network and system resources to reduce congestion in bottlenecks while still allowing data to be accessible from a central location.

In many embodiments, method 400 can comprise an activity 405 of monitoring second activities of a user over a second time period. In various embodiments, monitoring second activities of a user can comprise gathering and storing data about interactions of a user with GUI 330, 331 or another GUI (e.g., mouse movements, clicks, vision tracking, etc.). In the same or different embodiments, monitoring second activities of a user can comprise gathering data on views of an item of a category of items, cart adds of an item of a category of items, registry adds of an item of a category of items, transactions involving an item of a category of items, and/or searches for an item of a category of items. In many embodiments, a second time period can comprise one day, two days, three days, one month, two months, three months, one year, two years, three years, etc. In the same or different embodiments, a second time period can occur when a user is determined to be in a first state, as described above. In many embodiments, a second time period can occur when a user is in a first state. In some embodiments, a second time period can be the same duration or a different duration than the first time period of activity 401. In some embodiments, the second time period begins immediately after the first time period, and in other embodiments, an interim time period occurs between the end of the first period and the beginning of the second time period.

In some embodiments, activity 405 and other activities in method 400 can comprise using a distributed network comprising distributed memory architecture to monitor second activities of a user over a second time period. This distributed architecture can reduce the impact on the network and system resources to reduce congestion in bottlenecks while still allowing data to be accessible from a central location.

In many embodiments, method 400 can comprise activity 406 of identifying a second probability of a user transitioning into a second state. In the same or different embodiments, a second probability of a user transitioning into a second state can be based on data gathered concerning second activities of a user over a second time period, such as data gathered in activity 405 as described above. In various embodiments, the second state in activity 405 can be related to the first state as described in activity 402. In these embodiments, the second state can be a progression or regression of the first state. For example, if the first state comprises an expectant mother or pregnant woman, the second state can comprise a mother having a newborn, a mother having a toddler, a mother having a young child, etc. As a second example, if the first state comprises landscaping an outdoor area, the second state can comprising buying patio furniture, buying lawn tools such as a lawn mower, a weed whacker, and a hedge trimmer, or installing a backyard shed or remodeling a garage to store the lawn tools. As a third example, if the first state comprises baking, the second state can comprise buying a muffin tin or remodeling a kitchen to add double convection ovens.

In some embodiments, a second probability that a user has transitioned from a first state into a second state can be determined using a mixed model. In many embodiments, a mixed model can comprise a mathematical model and/or a machine learning algorithm. In various embodiments, a mixed model can comprise a hybrid of two different model and/or algorithm types. For example, a mixed model can comprise a mix of a Gaussian model and a Markov model. When the mixed model includes a Markov model, the Markov model of the mixed model used to determine a second probability that a user has transitioned into a second state can be the same as or different from the Markov model used to determine a first probability that a user has transitioned into a first state. As another example, the mixed model does not include a Markov model, and/or the mixed model does not include a Gaussian model. A mixed model can provide several advantages over individual models used in sequence or concurrently. For example, a mixed model can reduce noise in observations by allowing anomalies to be assigned to an outlier model and/or by having a variance of a Gaussian portion of the mixed model manually set to a larger value, thereby creating a more accurate determination of a state transition probability. Further, a mixed model can aid in modeling variations in observed interactions with a GUI, thereby creating a more accurate determination of a state transition probability. For example, assume that babies of a specific ethnicity begin to walk before babies of other ethnicities. A mixed model allows one to delineate this pattern without averaging in situations where an average doesn't correspond to any specific population. In the same or different embodiments, a Markov model portion of a mixed model can be the same, similar, or different than a Markov model as described in activity 402. In some embodiments, a mixed model can comprise $\psi(s_t=i, s_{t+i}=j; \Delta t) \sim \Sigma_c P(c) \mathcal{N} (\Delta t; \mu_{ijc}, \sigma_{ijc}^2)$, wherein $s_t$ comprises a state at time t, i comprises a first specific value of a variable representing a state, $s_{t+1}$ comprises a second state following the first state, j comprises a second specific value of a variable representing a state, $\Delta t$ comprises a length of time, P(c) comprises a prior probability of a transition as determined by a second mixed model, $\mathcal{N} (\Delta t; \mu_{ijc}, \sigma_{ijc}^2)$ comprises a Gaussian distribution of a length of time $\Delta t$, a mean of the Gaussian distribution $\mu_{ijc}$, and a variance of the Gaussian distribution $\sigma_{ijc}^2$.

In some embodiments, activity 406 and other activities in method 400 can comprise using a distributed network comprising distributed memory architecture to identify a second probability of a user transitioning into a second state. This distributed architecture can reduce the impact on the network and system resources to reduce congestion in bottlenecks while still allowing data to be accessible from a central location. Use of distributed networks are especially applicable for identifying a second probability of a user transitioning into a second state, as computation of large datasets can reduce processing speeds and increase processing burdens on single processor computer systems.

In many embodiments, method 400 can comprise activity 407 of determining when a second probability is above a second probability predefined threshold. In some embodiments, a second probability predefined threshold can be set by an administrator of system 300. In various embodiments, activity 403 can comprise determining when a second probability is below a second probability predefined threshold. In the same or different embodiments, a second probability predefined threshold can be equal to or different than the first probability predefined threshold of activity 403. In some embodiments, activity 407 and other activities in method 400 can comprise using a distributed network comprising distributed memory architecture to determine when a second probability is above a second probability predefined threshold. This distributed architecture can reduce the impact on the network and system resources to reduce congestion in bottlenecks while still allowing data to be accessible from a central location.

In many embodiments, method 400 can comprise activity 408 of customizing a second content on a graphical user interface (GUI). In various embodiments, the GUI can comprise GUI 330, 331 (FIG. 3). In some embodiments, customizing a second content on a GUI can occur in response to activity 407 of determining when a second probability is above a second probability predefined threshold. In the same or different embodiments, customizing a second content on a GUI can comprise altering an image displayed on the GUI, altering text on the GUI, altering a layout of the GUI, changing the type of GUI, displaying an advertisement, displaying no advertisement, altering a color displayed on the GUI, etc. In many embodiments, customizing a second content on a GUI can comprise displaying certain content at specific times. In further embodiments, a second content can comprise advertisements for products and/or services. In various embodiments, a second content can be related to a second state of a user and/or a first state that a user has been determined to be in. In some embodiments, a second content on a GUI can be the same or different as a first content on a GUI, as described above. In many embodiments, customization of a GUI can create a second GUI. In the same or different embodiments, a second GUI can be the same or different than GUI 330, 331 (FIG. 3). In many embodiments, customizing a second content on a GUI can occur when a user is in a second state, as identified above. In the same or different embodiments, customizing a second content on a GUI can occur when a user is determined to be in a second state. In some embodiments, activity 408 and other activities in method 400 can comprise using a distributed network comprising distributed memory architecture to customize a second content on a graphical user interface. This distributed architecture can reduce the impact on the network and system resources to reduce congestion in bottlenecks while still allowing data to be accessible from a central location.

Figure 5:
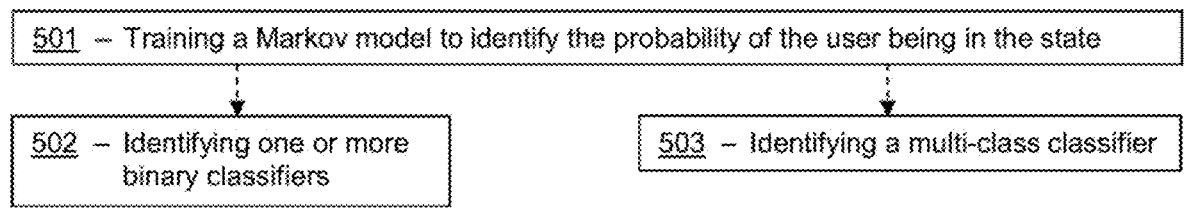
FIG. 5 is a flowchart for a method, according to certain embodiments.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In various embodiments, method 500 can be performed as a part of, in conjunction with, and/or completely separate from method 400 (FIG. 4). In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules, such non-transitory memory storage modules can be part of a computer system such as server computer 310, internet 320, GUI 330, 331, and/or user computer 340, 341 (FIG. 3). The processing module(s) can be similar or identical to the processing module(s) described above with respect to computer system 100 (FIG. 1).

In many embodiments, method 500 can comprise an activity 501 of training a Markov model to identify the probability of a user being in a first state. In some embodiments, model training can comprise estimating internal parameters of a model configured to predict a probability of a user being in a first state, as described above. In the same or different embodiments, training a Markov model to identify a probability of a user being in a first state can further comprise training a Markov model on a training dataset. In the same or different embodiments, a training dataset can comprise pre-labeled data about interactions of a user with GUI 330, 331. In many embodiments, a training dataset can be gathered for various states (e.g., first trimester, second trimester, third trimester, new mom, baby ready to start solids, etc.). In the same or different embodiments, each line record in a training dataset can have features pertaining to historical data for interactions with a GUI (e.g., views of prenatal vitamins, purchases of a camera, searches for baby care, etc.), and a label to indicate a state of a user. Therefore, in various embodiments, pre-labeled data can comprise data about interaction of a user with GUI 330, 331 wherein a state of the user is known.

In many embodiments, a Markov model can be trained on a two-layered deep neural network. In the same or different embodiments, a two-layered deep neural network can be trained on data comprising a user's omni-channel activity, which can comprise interactions with a GUI. In some embodiments, an input into a two-layered deep neural network can comprise training datasets aggregate across one or more time resolutions. In these embodiments, expressability of the training dataset inputted into the model can be increased.

In some embodiments, activity 501 and other activities in method 500 can comprise using a distributed network comprising distributed memory architecture to train a Markov model to identify the probability of a user being in a first state. This distributed architecture can reduce the impact on the network and system resources to reduce congestion in bottlenecks while still allowing data to be accessible from a central location. Use of distributed networks are especially applicable for training a Markov model to identify the probability of a user being in a first state, as computation of large datasets can reduce processing speeds and increase processing burdens on single processor computer systems. For example, instead of encoding ten interactions with a GUI within one year, it can be beneficial to encode nine interactions within the last six months, one interaction within the last month, and zero interactions within the last day.

In many embodiments, method 500 can comprise an activity 502 of identifying one or more binary classifiers. In the same or different embodiments, each binary classifier of one or more binary classifiers can be independently capable of identifying a first probability of a user being in a first state. In some embodiments, activity 502 and other activities in method 500 can comprise using a distributed network comprising distributed memory architecture to identify one or more binary classifiers. This distributed architecture can reduce the impact on the network and system resources to reduce congestion in bottlenecks while still allowing data to be accessible from a central location. Use of distributed networks are especially applicable for identifying one or more binary classifiers, as computation of large datasets can reduce processing speeds and increase processing burdens on single processor computer systems.

In many embodiments, method 500 can comprise an activity 503 of identifying a multi-class classifier. In various embodiments, a multi-class classifier can be capable of assigning a distribution over a first probability of the user being in the first state. In some embodiments, activity 503 and other activities in method 500 can comprise using a distributed network comprising distributed memory architecture to identify a multi-class classifier. This distributed architecture can reduce the impact on the network and system resources to reduce congestion in bottlenecks while still allowing data to be accessible from a central location. Use of distributed networks are especially applicable for identifying a multi-class classifier, as computation of large datasets can reduce processing speeds and increase processing burdens on single processor computer systems.

Model Training Working Example

This section will describe specific datasets used to train a deep neural network for snapshot modeling of $\pi$ for a specific embodiment of a model for tracking baby life stages from first trimester onwards. User features f(u) were derived completely from historical web logs over a two year window. Where applicable omni-channel data (e.g., in store transactions) were included in user features f(u). Features were formed that comprised counts of item views, cart adds, searches, and transactions across all leaf nodes in an item taxonomy. Further, features were also aggregated at various temporal resolutions (e.g., last day, last week, last month, etc.). These feature sets, temporal resolution windows, and lengths of historical data are each configurable parameters in the system. Output labels were estimated based on baby registry creation dates and the expected delivery date submitted by users during registry creation. For example, when a registry owner declared a delivery date D, f(u) can comprise a label of new mom in an interval of (D±t), where t comprises a configurable parameter. In these specific embodiments, t was set to 7, and only allowed for duplicate labels when activity in the account is recorded. In other words, we allowed a user record to be generated in the specified interval, even if no events were observed.

Figure 6:
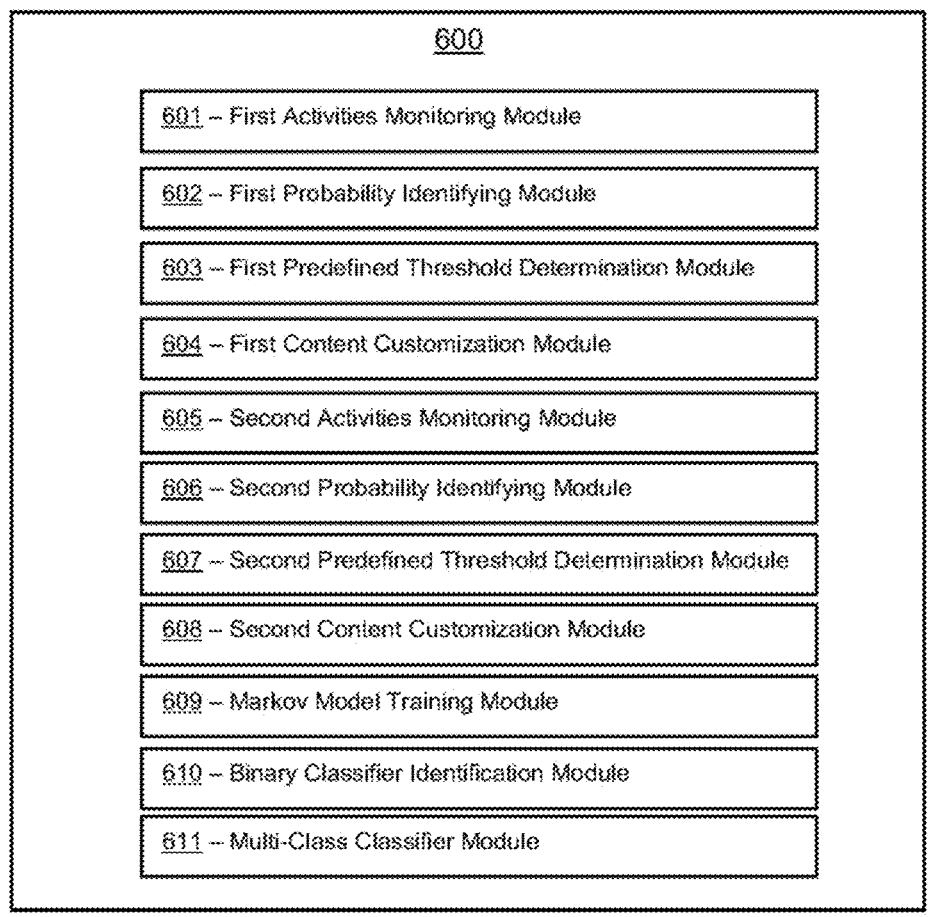
FIG. 6 illustrates a representative block diagram of a system, according to an additional embodiment.

Turning ahead in the drawings, FIG. 6 illustrates a block diagram of a system 600 that can be employed for altering a user interface using predicted user activity. System 600 is merely exemplary and embodiments of the system are not limited to the embodiments presented herein. In some embodiments, system 600 can be the same as system 300 (FIG. 3) System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600.

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as first activities monitoring module 601. In many embodiments, first activities monitoring module 601 can store computing instructions configured to run on one or more processing modules and perform one or more acts of method 400 (FIG. 4) (e.g., activity 401 (FIG. 4)).

In many embodiments, system 600 can comprise non-transitory memory storage module 602. Memory storage module 602 can be referred to as first probability identifying module 602. In many embodiments, first probability identifying module 602 can store computing instructions configured to run on one or more processing modules and perform one or more acts of method 400 (FIG. 4) (e.g., activity 402 (FIG. 4)).

In many embodiments, system 600 can comprise non-transitory memory storage module 603. Memory storage module 603 can be referred to as first predefined threshold determination module 603. In many embodiments, first predefined threshold determination module 603 can store computing instructions configured to run on one or more processing modules and perform one or more acts of method 400 (FIG. 4) (e.g., activity 403 (FIG. 4)).

In many embodiments, system 600 can comprise non-transitory memory storage module 604. Memory storage module 604 can be referred to as first content customization module 604. In many embodiments, first content customization module 604 can store computing instructions configured to run on one or more processing modules and perform one or more acts of method 400 (FIG. 4) (e.g., activity 404 (FIG. 4)).

In many embodiments, system 600 can comprise non-transitory memory storage module 605. Memory storage module 605 can be referred to as second activities monitoring module 605. In many embodiments, second activities monitoring module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as second probability identifying module 606. In many embodiments, second probability identifying module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as second predefined threshold determination module 607. In many embodiments, second predefined threshold determination module 607 can store computing instructions configured to run on one or more processing modules and perform one or more acts of method 400 (FIG. 4) (e.g., activity 407 (FIG. 4)).

In many embodiments, system 600 can comprise non-transitory memory storage module 608. Memory storage module 608 can be referred to as second content customization module 608. In many embodiments, second content customization module 608 can store computing instructions configured to run on one or more processing modules and perform one or more acts of method 400 (FIG. 4) (e.g., activity 408 (FIG. 4)).

In many embodiments, system 600 can comprise non-transitory memory storage module 609. Memory storage module 609 can be referred to as Markov model training module 609. In many embodiments, Markov model training module 609 can store computing instructions configured to run on one or more processing modules and perform one or more acts of method 500 (FIG. 5) (e.g., activity 501 (FIG. 5)).

In many embodiments, system 600 can comprise non-transitory memory storage module 610. Memory storage module 610 can be referred to as binary classifier identification module 610. In many embodiments, binary classifier identification 610 can store computing instructions configured to run on one or more processing modules and perform one or more acts of method 500 (FIG. 5) (e.g., activity 502 (FIG. 5)).

In many embodiments, system 600 can comprise non-transitory memory storage module 611. Memory storage module 611 can be referred to as multi-class classifier module 611. In many embodiments, multi-class classifier module 611 can store computing instructions configured to run on one or more processing modules and perform one or more acts of method 500 (FIG. 5) (e.g., activity 503 (FIG. 5)).

Although systems and methods for altering a user interface using predicted user activity have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and perform acts of:
monitoring first activities of a user over a first time period;
based on the first activities of the user over the first time period, identifying, using a Markov model, a first probability of the user being in a first state;
determining when the first probability is above a first probability predefined threshold;
in response to determining when the first probability is above the first probability predefined threshold, automatically customizing first content on a graphical user interface for the first state to create a first graphical user interface on an electronic device of the user while the user is determined to be in the first state;

monitoring second activities of the user over a second time period occurring after the first time period and after the user has been determined to be in the first state and before the user has been determined to be in a second state;

based on the second activities of the user over the second time period, identifying, using a mixed model different from the Markov model, a second probability that the user has transitioned from the first state into the second state, wherein the second state is related to the first state;

determining when the second probability is above a second probability predefined threshold; and in response to determining when the second probability is above the second probability predefined threshold, automatically customizing a second content on the graphical user interface for the second state to create a second graphical user interface on the electronic device of the user while the user is determined to be in the second state.

2. The system of claim 1, wherein the computing instructions are further configured to perform acts of:

training the Markov model to identify the first probability of the user being in the first state, wherein training the Markov model comprises:

identifying one or more binary classifiers, each binary classifier of the one or more binary classifiers independently capable of identifying the first probability of the user being in the first state; or identifying a multi-class classifier capable of assigning a distribution over the first probability of the user being in the first state.

3. The system of claim 2, wherein the Markov model is trained on a deep neural network.

4. The system of claim 1, wherein the mixed model comprises a mix of a Gaussian model and a second Markov model.

5. The system of claim 1, wherein monitoring the first activities of the user comprises:

gathering information comprising at least one of:
views of an item of a category of items;
cart adds of the item of the category of items;
registry adds of the item of the category of items;
transactions involving the item of the category of items; or
searches for the item of the category of items.

6. The system of claim 1, wherein automatically customizing the first content on the graphical user interface comprises at least one of:

automatically changing one or more images on the graphical user interface to first images related to the first state;
automatically changing text displayed on the graphical user interface to first text related to the first state; or
automatically altering a layout of the graphical user interface for the first state.

7. The system of claim 1, wherein the first and second states comprise life events in a sequence of life events of the user.

8. The system of claim 1, wherein the Markov model comprises:

$P(D) = \Pi_{t=1}^{T} P(s_t, f_t(u))$, wherein:

P(D) comprises a probability of a user being in the first state;

$s_t$ comprises a state at time t; and $f_t(u)$ comprises a set of observed feature of a user u.

9. The system of claim 8, wherein the Markov model further comprises:

$P(D) = \Pi_{t=1}^{T} \pi(s_t, f_t(u)) \psi(s_t, s_{t+1}; \Delta t)$, wherein $\psi(s_t, s_{t+1}; \Delta t)$ comprises a probability of a second state, $s_{t+1}$, following a first state, $s_t$, in $\Delta t$ units of time.

10. The system of claim 1, wherein:

the mixed model comprises a mix of a Gaussian model and a second Markov model; and the first and second states comprise life events in a sequence of life events of the user.

11. A method being implemented via execution of computing instructions configured to run at one or more processors and configured to be stored at non-transitory computer-readable media, the method comprising:

monitoring first activities of a user over a first time period;

based on the first activities of the user over the first time period, identifying, using a Markov model, a first probability of the user being in a first state;

determining when the first probability is above a first probability predefined threshold;

in response to determining when the first probability is above the first probability predefined threshold, automatically customizing first content on a graphical user interface for the first state to create a first graphical user interface on an electronic device of the user while the user is determined to be in the first state;

monitoring second activities of the user over a second time period occurring after the first time period and after the user has been determined to be in the first state and before the user has been determined to be in a second state;

based on the second activities of the user over the second time period, identifying, using a mixed model different from the Markov model, a second probability that the user has transitioned from the first state into the second state, wherein the second state is related to the first state;

determining when the second probability is above a second probability predefined threshold; and in response to determining when the second probability is above the second probability predefined threshold, automatically customizing a second content on the graphical user interface for the second state to create a second graphical user interface on the electronic device of the user while the user is determined to be in the second state.

12. The method of claim 11 further comprising:

training the Markov model to identify the first probability of the user being in the first state, wherein training the Markov model comprises:

identifying one or more binary classifiers, each binary classifier of the one or more binary classifiers independently capable of identifying the first probability of the user being in the first state; or identifying a multi-class classifier capable of assigning a distribution over the first probability of the user being in the first state.

13. The method of claim 12, wherein the Markov model is trained on a deep neural network.

14. The method of claim 11, wherein the mixed model comprises a mix of a Gaussian model and a second Markov model.

15. The method of claim 11, wherein monitoring the first activities of the user comprises:

gathering information comprising at least one of:
views of an item of a category of items;
cart adds of the item of the category of items;
registry adds of the item of the category of items;

transactions involving the item of the category of items; or searches for the item of the category of items.

16. The method of claim 11, wherein automatically customizing the first content on the graphical user interface comprises at least one of:

automatically changing one or more images on the graphical user interface to first images related to the first state;

automatically changing text displayed on the graphical user interface to first text related to the first state; or automatically altering a layout of the graphical user interface for the first state.

17. The method of claim 11, wherein the first and second states comprise life events in a sequence of life events of the user.

18. The method of claim 11, wherein the Markov model comprises:

$P(D) = \Pi_{t=1}^{T} P(s_t, f_t(u))$, wherein:

P(D) comprises a probability of a user being in the first state;

$s_t$ comprises a state at time t; and $f_t(u)$ comprises a set of observed feature of a user u.

19. The method of claim 18, wherein the Markov model further comprises:

$P(D) = \Pi_{t=1}^{T} \pi(s_t; f_t(u)) \psi(s_t, s_{t+1}; \Delta t)$, wherein $\psi(s_t, s_{t+1}; \Delta t)$ comprises a probability of a second state, $s_{t+1}$, following a first state, $s_t$, in $\Delta t$ units of time.

20. The method of claim 11, wherein:

the mixed model comprises a mix of a Gaussian model and a second Markov model; and the first and second states comprise life events in a sequence of life events of the user.

* * * * *